Sept. 11, 1951          F. W. ANDERSON          2,567,797
CURRENT SUPPLY APPARATUS
Filed Feb. 18, 1950
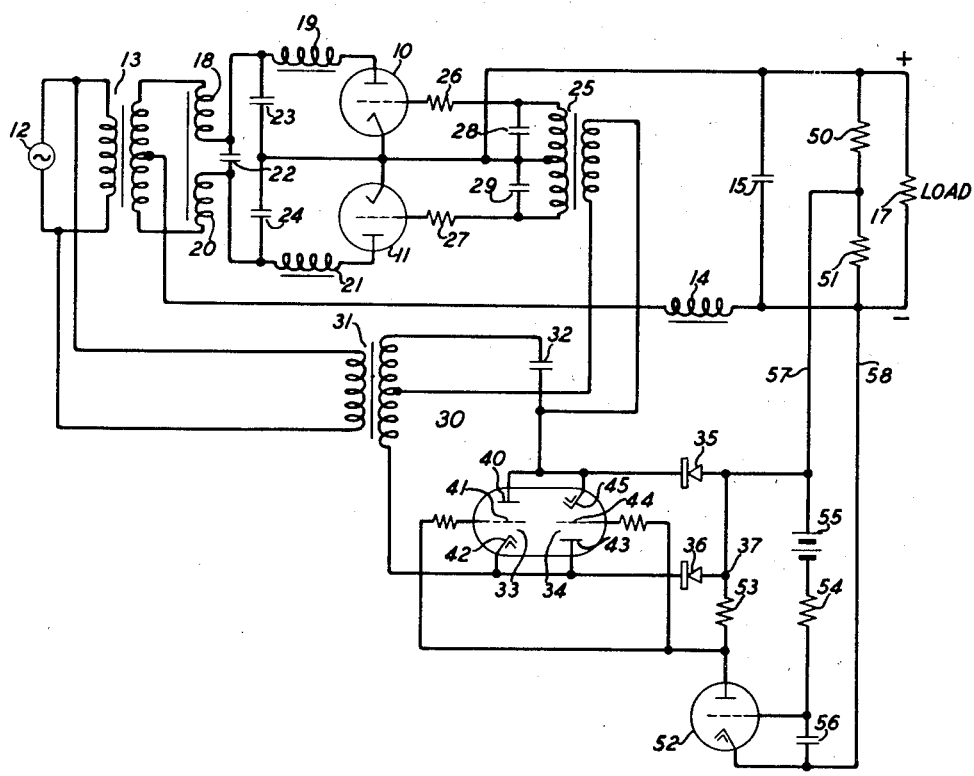
INVENTOR
F. W. ANDERSON
BY
ATTORNEY Patented Sept. 11, 1951

2,567,797

UNITED STATES PATENT OFFICE 2,567,797

CURRENT SUPPLY APPARATUS

Frederic W. Anderson, Lynbrook, N. Y., assignor to Bell Telephone Laboratories, Incorporated, New York, N. Y., a corporation of New York Application February 18, 1950, Serial No. 144,964

1 Claim. (Cl. 321—40)

This invention relates to current supply apparatus and more particularly to a full wave phase shift bridge circuit for controlling the current supplied by a space current rectifier to a load.

An object of the invention is to provide improved apparatus for shifting the phase of an alternating voltage.

This invention is an improvement over the invention disclosed and claimed in my copending application Serial No. 111,208, filed August 8, 1949.

In a preferred embodiment of the invention, herein shown and described for the purpose of illustration, there is provided a full wave rectifier circuit comprising two gas-filled, grid controlled, space discharge tubes, known as thyratrons, for rectifying current from an alternating-current supply source and for supplying the rectified current to a load. There is derived from the output of a full wave phase shift bridge circuit to which current is supplied from the supply source, an alternating voltage of variable phase which is impressed upon the grid-cathode circuits of the rectifier tubes for initiating space current conduction in the tubes alternately, each tube being made conductive during a variable portion of each half cycle of the alternating voltage in which its anode is positive with respect to its cathode as determined by the phase of the derived voltage relative to that of the supply source.

The full wave phase shift bridge circuit comprises four impedance arms, two similar arms of which are half portions, respectively, of a secondary winding of a transformer the primary winding of which is connected to the alternating current supply line. A third bridge arm is a capacitance and the fourth bridge arm comprises the space current paths of two grid controlled space current devices or triodes having their space current paths reversely connected in parallel, that is, the anode of a first of the devices being connected to the cathode of the second device and the cathode of the first device being connected to the anode of the second device. A shunt current path connected across the anode-cathode paths of the two space current devices comprises two oppositely poled asymmetrically conducting devices such as varistors. The common terminal of the varistors is connected to the grid of each triode through a source of variable, unidirectional control voltage which may vary in accordance with changes of load voltage or load current, for example, the positive terminal of the control voltage source being connected to the common terminal of the varistors.

When the polarity across the first of the triodes is such as to cause space current to flow therein, the current flow through the first of the varistors which is in a circuit connecting the anode and control grid of the first triode is in the reverse or high resistance direction and the current flow through the second varistor which is in a circuit connecting the control grid and cathode of the first triode is in the forward or low resistance direction. The voltage drop across the second varistor is thus negligibly small and the anode-cathode resistance of the triode is determined solely by the negative control potential impressed upon its grid with respect to its cathode. A similar operation results when the second triode conducts space current since the current flow through the second varistor is then in the reverse or high resistance direction and that through the first varistor is in the forward or low resistance direction so that the voltage drop across the first varistor is negligibly small.

The single figure of the accompanying drawing is a schematic view of a regulated rectifier embodying the invention.

Referring to the drawing, there is shown a full wave rectifier comprising two gas-filled, grid controlled, space current tubes 10 and 11 for rectifying current supplied thereto from an alternating-current supply source 12 through a circuit comprising a transformer 13 and for supplying rectified current to a load circuit comprising a ripple filter having a series inductance element 14 and a shunt condenser 15, and a load 17. One end terminal of the secondary winding of transformer 13 is connected through inductance winding 18 and inductance element 19 to the anode of tube 10 while the other end terminal of the secondary transformer winding is connected through inductance winding 20 and inductance element 21 to the anode of tube 11, windings 18 and 20 having a common core. Filtering condenser 22 is provided in a path connecting a common terminal of inductance windings 18 and 19 and a common terminal of inductance windings 20 and 21. Filtering condenser 23 is in a path connecting the common terminal of windings 18 and 19 and the cathode of tube 10 while condenser 24 is in a path connecting the common terminal of windings 20 and 21 and the cathode of tube 11.

The instant at which conduction is initiated in tubes 10 and 11 during the half cycle periods of alternating-current source 12 when the anodes of tubes 10 and 11, respectively, are positive with respect to their cathodes is controlled by varying the phase of the alternating voltages derived from source 12 and impressed upon the control grid-cathode circuits of tubes 10 and 11 through input transformer 25. One end terminal of the secondary winding of transformer 25 is connected through a resistor 26 to the grid of tube 10, the other end terminal of the secondary winding is connected through a resistor 27 to the grid of tube 11 and a mid-tap of the secondary winding is connected to the cathodes of tubes 10 and 11. A condenser 28 is connected across one half portion and condenser 29 is connected across the other half portion of the secondary winding of transformer 25.

The primary of transformer 25 is connected to the output vertices of a phase shift bridge network 30 having four impedance arms. An alternating voltage derived from alternating-current source 12 is impressed across the input vertices of the bridge by means of a transformer 31 the primary of which is connected to the current source 12. One half portion of the secondary winding of transformer 31 is connected in one arm of the bridge, the other half portion of the secondary winding is connected in a second arm of the bridge and a condenser 32 is connected in a third arm. The fourth arm of the bridge network has three parallel branch paths, the first path comprising the space current path of a triode space current device 33, the second branch path comprising the space current path of a second triode 34 and the third branch path comprising asymmetrically conducting varistors 35 and 36 having a common terminal 37. An asymmetrically conducting varistor may be a copper oxide or selenium rectifying element, for example, the resistance of which in the forward or conducting direction is much less than its resistance in the reverse direction. The characteristics of such elements are described, for example, in an article by J. A. Becker on page 322 of "Bell Laboratories Record," for July 1940. Triode 33 comprises an anode 40, control grid 41 and cathode 42 while triode 34 comprises an anode 43, control grid 44 and cathode 45. Anode 40, cathode 45, a terminal of varistor 35 and a terminal of condenser 32 are conductively connected to one of the output vertices of the bridge network. Cathode 42, anode 43 and a terminal of varistor 36 are conductively connected to one of the input vertices of the bridge. During half cycle periods of the alternating current when anode 40 is at a positive potential with respect to the potential of cathode 42, current flows through varistor 35 in the reverse or high resistance direction and through varistor 36 in the forward or low resistance direction with the result that the voltage drop across varistor 36 is negligibly small. During half cycle periods of opposite polarity when anode 43 is positive with respect to cathode 45, current flows through varistor 36 in the reverse or high resistance direction and through varistor 35 in the forward or low resistance direction with the result that the voltage drop across varistor 35 is negligibly small. The triodes 33 and 34 are preferably the triodes of a twin triode tube but two single triode tubes can be provided if desired.

A voltage divider comprising resistors 50 and 51, in series, is connected across the load 17. There is provided an amplifier space current device 52 to which space current is supplied by rectifier 10, 11 through a circuit which may be traced from the positive load terminal, through resistors 50 and 53 to the anode, and from the cathode of tube 52 to the negative load terminal.

The control grid-cathode circuit of tube 52 may be traced from the grid, through resistor 54 to the negative terminal of battery 55 and from the positive battery terminal, through resistor 51 to the cathode of tube 52. Instead of the battery 55 for providing a reference voltage source in the grid-cathode circuit of tube 52, there may be used a portion at least of the voltage across a cold cathode gas-filled tube to which rectified current is supplied through a resistive circuit. One plate of a condenser 56 is connected to the control grid of tube 52 and the other condenser plate is connected to the cathode of the tube. Resistor 54 and condenser 56 are provided for preventing hunting.

The amplifier circuit comprising tube 52 causes to be produced across resistor 53 a unidirectional voltage having amplitude changes corresponding to load voltage changes, the percentage change of the voltage across resistor 53 being large relative to the percentage change of the load voltage. When the load voltage increases by a small amount, for example, the voltage across resistor 53 increases to make the grid 41 more negative with respect to cathode 42 and to make the grid 44 more negative with respect to cathode 45. The resistance of the arm of the bridge comprising the space current paths of triodes 33 and 34 is thus increased during both half cycles of the alternating-current wave to shift the phase, in the lagging direction, of the voltage wave applied to the grid-cathode circuits of tubes 10 and 11 with respect to the voltage applied to the anode-cathode circuits of the tubes. Space current conduction in tubes 10 and 11 is thus initiated later in the positive half cycles of the anode voltage to cause the initially assumed increase of load voltage to be minimized. Instead of connecting the leads 57 and 58 across resistor 51, they may be connected across a small resistor which is in series with the load for causing the load current to be maintained substantially constant. Moreover, if desired, a voltage proportional to the load voltage and a voltage proportional to the load current may be combined to set up a voltage equal to the sum or the difference of the two voltages which may be impressed across the leads 57 and 58.

What is claimed is:

In combination, a full wave rectifier comprising two space current rectifying devices each having an anode, a cathode and a control grid for rectifying current from an alternating-current supply source and for supplying the rectified current to a load circuit, a phase shift bridge network having four impedance arms for shifting the phase of an alternating voltage supplied from said supply source to the input vertices of said bridge, means for supplying said phase shifted wave from the output vertices of said bridge to the grid-cathode circuits of said rectifying devices to control the rectified current supplied from said rectifier to said load, a first of said impedance arms comprising a first condenser, a second of said impedance arms comprising a third space current device having an anode connected to one of said output vertices, a cathode connected to one of said input vertices and a control grid, a fourth space current device having an anode connected to said one input vertex, a cathode connected to said one output vertex and a control grid, a first asymmetrically conducting varistor connected between said one output vertex and a common terminal and presenting its relatively high reverse resistance to current flow therethrough in a direction from said one output vertex to said common terminal, a second asymmetrically conducting varistor connected between said one input vertex and said common terminal and presenting its relatively high reverse resistance to current flow therethrough in a direction from said one input terminal to said common terminal, a fifth space current device having an anode, a cathode and a control electrode, means for connecting the anode of said fifth space current device to the control electrodes of said third and fourth space current devices, a first resistor, means for connecting the terminals of said first resistor to said common terminal and to the anode of said fifth space current device, respectively, means for impressing a portion at least of the load voltage across a current path comprising in series said first resistor and the space current path of said fifth space current device, a second resistor, an auxiliary source of unidirectional voltage, a circuit connecting said control electrode and said cathode of said fifth space current device comprising in series said second resistor, said auxiliary voltage source and in opposition to said auxiliary source a portion at least of said load voltage, a second condenser, and means for connecting the terminals of said second condenser to the control electrode and cathode, respectively, of said fifth space current device.

FREDERIC W. ANDERSON.

REFERENCES CITED

The following references are of record in the file of this patent:

UNITED STATES PATENTS

| Number | Name | Date |
|---|---|---|
| 2,141,922 | Lord | Dec. 27, 1938 |
| 2,196,680 | Milarta | Apr. 9, 1940 |
| 2,329,127 | Levy | Sept. 7, 1943 |